(12) United States Patent
Kim

(10) Patent No.: US 8,562,221 B2  
(45) Date of Patent: Oct. 22, 2013

(54) SPINDLE MOTOR

(75) Inventor: Ju Ho Kim, Seoul (KR)

(73) Assignee: Samsung Electro-Mechanics Co., Ltd., Suwon, Gyunggi-do (KR)

(*) Notice: Subject to any disclaimer, the term of this patent is extended or adjusted under 35 U.S.C. 154(b) by 16 days.

(21) Appl. No.: 13/250,723

(22) Filed: Sep. 30, 2011

(65) Prior Publication Data

US 2012/0314983 A1    Dec. 13, 2012

(30) Foreign Application Priority Data

Jun. 10, 2011    (KR) .................... 10-2011-0056229

(51) Int. Cl.  
*F16C 32/06* (2006.01)  
*F16C 33/74* (2006.01)

(52) U.S. Cl.  
USPC ............ 384/119; 384/100; 384/114; 384/132

(58) Field of Classification Search  
USPC ........... 384/100, 107, 112, 114, 119, 132; 310/90; 360/99.07, 99.08  
See application file for complete search history.

(56) References Cited

U.S. PATENT DOCUMENTS

| | | | | |
|---|---|---|---|---|
| 5,281,886 A * | 1/1994 | Ohta | .............................. | 310/90 |
| 6,315,452 B1 * | 11/2001 | Titcomb | ...................... | 384/114 |
| 6,888,278 B2 * | 5/2005 | Nishimura et al. | ........ | 360/99.08 |
| 7,635,936 B2 * | 12/2009 | Sumi | .............................. | 310/90 |
| 7,868,499 B2 * | 1/2011 | Kim | ................................ | 384/119 |
| 2004/0190802 A1 * | 9/2004 | Gomyo et al. | ................ | 384/100 |
| 2006/0002641 A1 * | 1/2006 | Ichiyama | ..................... | 384/100 |
| 2006/0083450 A1 * | 4/2006 | Sekii et al. | ................... | 384/100 |
| 2007/0013249 A1 * | 1/2007 | Engesser et al. | ............. | 384/112 |
| 2007/0206890 A1 * | 9/2007 | Kim | ................................ | 384/119 |
| 2008/0218019 A1 * | 9/2008 | Sumi | .............................. | 310/90 |
| 2009/0046960 A1 * | 2/2009 | Hibi et al. | .................... | 384/107 |
| 2011/0101807 A1 * | 5/2011 | Yu | ................................. | 310/90 |

* cited by examiner

*Primary Examiner* — Marcus Charles  
(74) *Attorney, Agent, or Firm* — Blakely Sokoloff Taylor & Zafman LLP

(57) ABSTRACT

Disclosed herein is a spindle motor including: a shaft; a sleeve supporting the shaft; a hub including the shaft coupled to the center of rotation thereof; a sealing member including an operating fluid provided between the shaft and the sleeve and formed to be spaced apart from an outer peripheral surface of the sleeve; an oil sealing part including an oil interface formed between an inner peripheral surface of the sealing member and the outer peripheral surface of the sleeve facing each other, and a sealing surface layer formed on an outer side of the oil interface. The sealing surface layer is formed from an inner side of the oil interface formed in the oil sealing part of a fluid dynamic pressure bearing part toward the outer side thereof, thereby making it possible to improve an oil sealing effect in the oil interface.

4 Claims, 2 Drawing Sheets

SPINDLE MOTOR

CROSS REFERENCE TO RELATED APPLICATION

This application claims the benefit of Korean Patent Application No. 10-2011-0056229, filed on Jun. 10, 2011, entitled "Spindle Motor" which is hereby incorporated by reference in its entirety into this application.

BACKGROUND OF THE INVENTION

1. Technical Field

The present invention relates to a spindle motor.

2. Description of the Related Art

Generally, a spindle motor, which belongs to a brushless-DC motor (BLDC), has been widely used as a laser beam scanner motor for a laser printer, a motor for a floppy disk drive (FDD), a motor for an optical disk drive such as a compact disk (CD) or a digital versatile disk (DVD), or the like, in addition to a motor for a hard disk drive.

Recently, in a device such as a hard disk drive requiring high capacity and high speed driving force, in order to minimize generation of noise and non repeatable run out (NRRO), which is vibration generated at the time of use of a ball bearing, a spindle motor including a fluid dynamic pressure bearing having lower driving friction as compared to an existing ball bearing form has been generally used. In the fluid dynamic pressure bearing, a thin oil film is basically formed between a rotor and a stator, such that the rotor and stator are supported by pressure generated at the time of rotation. Therefore, the rotor and stator are not in contact with each other, such that frictional load is reduced. In the spindle motor using the fluid dynamic pressure bearing, lubricating oil (hereinafter, referred to as an 'operating fluid) maintains a shaft of the motor rotating a disk only with dynamic pressure (pressure returning fluid pressure to the center by centrifugal force of the shaft). Therefore, the spindle motor using the fluid dynamic pressure bearing is distinguished from a ball bearing spindle motor in which the shaft is supported by a shaft ball made of iron.

When the fluid dynamic pressure bearing is used in the spindle motor, the rotor is supported by the fluid, such that a noise amount generated in the motor is small, power consumption is low, and impact resistance is excellent.

However, in the spindle motor using the fluid dynamic pressure bearing according to the prior art, various problems such as scattering, or the like, of the operating fluid according to sealing of the operating fluid in the fluid dynamic pressure bearing have been generated. Particularly, an interface of the operating fluid, that is, an oil interface in the case in which oil is used as the operating fluid is significantly vulnerable to external impact, and the operating fluid is leaked to the outside due to impact, or the like, during operation. The leakage of the operating fluid deteriorates operating performance of the motor, thereby causing a serious problem such as deterioration in reliability of the motor operation.

SUMMARY OF THE INVENTION

The present invention has been made in an effort to provide a spindle motor preventing scattering of an operating fluid of a fluid dynamic pressure bearing to the outside and enhancing sealing of the operating fluid.

According to a preferred embodiment of the present invention, there is provided a spindle motor including: a shaft; a sleeve supporting the shaft; a hub including the shaft coupled to the center of rotation thereof; a sealing member including an operating fluid provided between the shaft and the sleeve and formed to be spaced apart from an outer peripheral surface of the sleeve; an oil sealing part including an oil interface formed between an inner peripheral surface of the sealing member and the outer peripheral surface of the sleeve facing each other, and a sealing surface layer formed on an outer side of the oil interface.

The sealing surface layer may include at least one prominence-depression.

The sealing surface layer may have surface roughness larger than those of the outer peripheral surface of the sleeve and the inner peripheral surface of the sealing member on an inner side of the oil interface.

The sealing surface layer may include the outer peripheral surface of the sleeve and the inner peripheral surface of the sealing member formed on the inner side of the oil interface and is formed to be extended in an outward direction of the oil interface.

The sealing surface layer may be formed on the outer peripheral surface of the sleeve or the inner peripheral surface of the sealing member.

DESCRIPTION OF THE PREFERRED EMBODIMENTS

Figure 1:
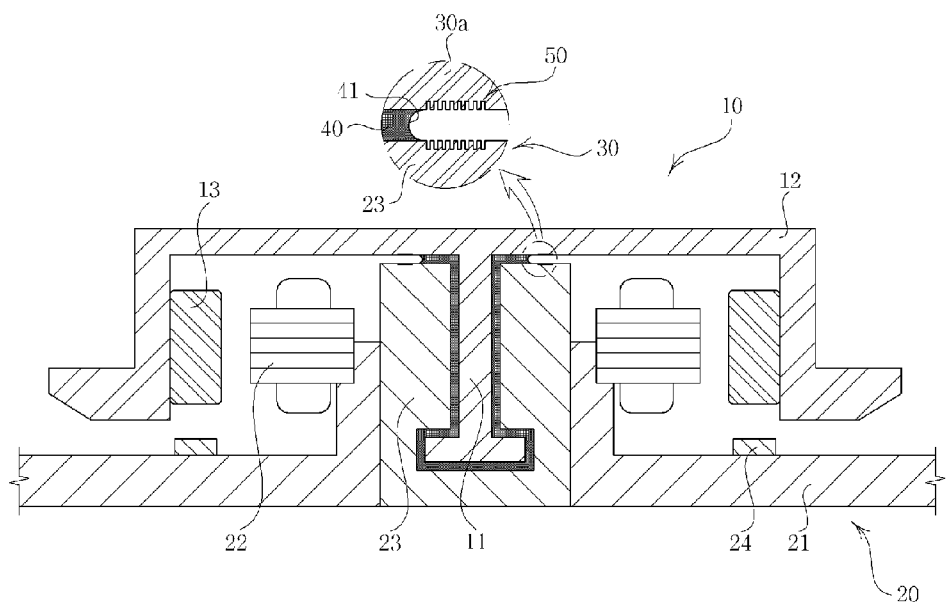
FIG. 1 is a view showing an oil sealing part of a spindle motor according to a preferred embodiment of the present invention.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In addition, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

A spindle motor according to a preferred embodiment of the present invention includes a shaft 11, a sleeve 23 supporting the shaft 11, a hub 12 including the shaft 11 coupled to the center of rotation thereof, a sealing member 30a including an operating fluid 40 provided between the shaft 11 and the sleeve 23 and formed to be spaced apart from an outer peripheral surface of the sleeve 23, an oil sealing part 30 including an oil interface 41 formed between an inner peripheral surface of the sealing member 30a and the outer peripheral surface of the sleeve 23 facing each other, and a sealing surface layer 50 formed on an outer side of the oil interface.

In this configuration, the sealing surface layer 50 may include at least one prominence-depression. In order to form a hydrophobic surface, a plurality of prominence-depressions may be formed in the outer peripheral surface of the sleeve 23 and the inner peripheral surface of the sealing member 30a that are formed on the outer side of the oil interface and face each other in a rotating direction of the shaft 11 based on the shaft 11. The sealing surface layer 50 may also be formed only on any one of the outer peripheral surface of the sleeve 23 and the inner peripheral surface of the sealing member 30a facing each other.

In addition, the sealing surface layer 50 has surface roughness larger than those of the outer peripheral surface of the sleeve 23 and the inner peripheral surface of the sealing member 30a on an inner side of the oil interface.

Further, the sealing surface layer 50 includes the outer peripheral surface of the sleeve 23 and the inner peripheral surface of the sealing member 30a formed on the inner side of the oil interface and is formed to be extended in an outward direction of the oil interface.

Furthermore, the sealing surface layer 50 is formed on the outer peripheral surface of the sleeve 23 or the inner peripheral surface of the sealing member 30a.

Hereinafter, preferred embodiments of the present invention will be described in detail with reference to the accompanying drawings.

Figure 2:
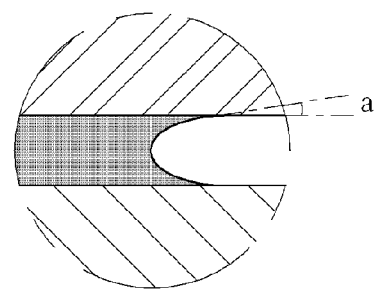
FIG. 2 is a view showing a contact angle at which an oil interface of the oil sealing part according to the prior art is formed.
Figure 3:
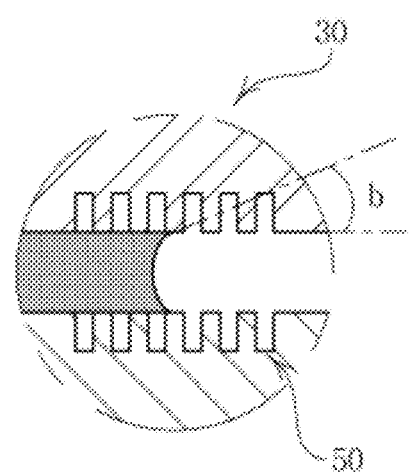
FIG. 3 is a view showing a contact angle at which an oil interface of the oil sealing part according to a preferred embodiment of the present invention is formed.

FIG. 1 is a view showing an oil sealing part 30 of a spindle motor according to a preferred embodiment of the present invention; FIG. 2 is a view showing a contact angle at which an oil interface of the oil sealing part 30 according to the prior art is formed; and FIG. 3 is a view showing a contact angle at which an oil interface of the oil sealing part 30 according to a preferred embodiment of the present invention is formed.

The shaft 11 is coupled to the center of the hub 12 and rotates in a state in which it is inserted into the sleeve 23. The shaft 11 generally has a cylindrical shape. The shaft 11 is formed to coincide with the center of rotation around which a rotor of the spindle motor rotates, and the sleeve 23 enclosing the shaft 11 so as to rotatably support the shaft 11 is formed on an outer peripheral surface of the shaft 11.

The sleeve 23 may support the shaft 11, and an inner peripheral surface of the sleeve 23 and the outer peripheral surface of the shaft 11 may include a fluid dynamic pressure bearing part formed by the operating fluid 40 therebetween. The sleeve 23 may include a coupling hole (not shown) formed therein so as to be coupled to the shaft 11. In order to form the fluid dynamic pressure bearing part, an outer peripheral part of the shaft 11 or an inner peripheral part of the sleeve 23 may include a plurality of radial dynamic pressure grooves (not shown) formed on one side thereof.

The hub 12 includes the shaft 11 coupled to the center of rotation thereof. The hub 12 also serves to press the sleeve 23 while being coupled to the shaft 11. The hub 12 itself may serve as the sealing member 30a for sealing the oil, or the hub 12 include the sealing member 30a to be described below extended therefrom and formed integrally therewith. Therefore, the fluid dynamic pressure bearing part is formed in a surface on which the hub 12 and the sleeve 23 are in contact with each other, thereby making it possible to form the oil sealing part 30 having the oil interface formed therein.

The sealing member 30a includes the operating fluid (40) provided between 5 the shaft 11 and the sleeve 23 and is formed to be spaced apart from the outer peripheral surface of the sleeve 23. A position of the sealing member 30a is determined according to a position at which the oil sealing part 30 is formed. According to the preferred embodiment of the present invention, the hub 12 also serves as the sealing member 30a, corresponding to the sleeve 23, thereby making it possible to form the oil sealing part 30, as shown in FIG. 1. Although not shown, the oil sealing part 30 may be formed to have a tapered shape in which it has a gradually reduced width from the inner side of the oil interface toward the outer side thereof in order to induce a capillary phenomenon for preventing scattering, or the like, of the oil.

The oil sealing part 30 includes the oil interface formed between one surface of the sleeve 23 and one surface of the sealing member 30a facing each other. In addition to oil, other materials may be used as the operating fluid 40. However, a case in which the oil or operating fluid 40 having the same property as or a similar property to that of the oil is used is described in the preferred embodiment of the present invention. The oil sealing part 30 may be formed in an axial direction. However, the oil sealing part 30 is not necessarily limited to being formed in the axial direction but may also be formed in a direction perpendicular to the axial direction according to a shape thereof. According to the preferred embodiment of the present invention, the oil sealing part 30 is formed in the direction perpendicular to the axial direction, as shown in FIG. 1. The sealing member 30a may be formed integrally with the hub 12, or the hub 12 may be structurally modified so as to serve as the sealing member 30a without using a separate member, as described above The sealing surface layer 50 is formed on the outer side of the oil interface. The sealing surface layer 50 has a more hydrophobic surface property than those of the inner peripheral surface of the sleeve 23 and the outer peripheral surface of the sealing member 30a that contacts the oil on the inner side of the oil interface and face each other. The hydrophobic surface means a surface having a property in which the surface has roughness, such that a contact area between the surface and oil, or the like, is relatively reduced. A contact angle at which the oil contacts a general surface is different from a contact angle at which the oil contacts a surface having high roughness. As shown in FIGS. 2 and 3, an oil sealing effect is changed due to a difference in surface roughness between the inner side and the outer side of the oil interface. More specifically, FIG. 2 shows a case in which the surfaces formed on the inner side and the outer side of the oil interface have the same roughness or is not subjected to any treatment according to the prior art, and FIG. 3 shows a case in which the sealing surface layer 50 is formed on the outer side of the oil interface according to the preferred embodiment of the present invention. A contact angle a at which the oil contacts the oil interface according to the prior art as shown in FIG. 2 is smaller than a contact angle b at which the oil contacts the sealing surface layer 50 as shown in FIG. 3. The contact angle b at which the oil contacts the sealing surface layer 50 according to the preferred embodiment of the present invention becomes larger, as compared to the case according to the prior art, such that a contact area between the oil and the surface is reduced. Therefore, force attracting the oil toward the inner side of the oil is entirely applied to the oil, such that an effect that the oil is further collected in the inner side of the oil interface is generated. A difference in contact angle of the oil through the processing of the sealing surface layer 50 as described in the preferred embodiment of the present invention is used, thereby making it possible to further improve an oil sealing effect in the oil sealing part 30. The sealing surface layer 50 may be formed on the outer side of the oil interface, and may be formed on any one or both of the outer peripheral surface of the sleeve 23 or the inner peripheral surface of the sealing member 30a that form the oil sealing part 30 and face each other. In addition, the hydrophobic surface is selectively formed on the outer the outer peripheral surface of the sleeve 23 or the inner peripheral surface of the sealing member 30a that have the oil interface formed therein and face each other to increase the contact angle of the oil in the oil interface, thereby making it possible to improve the oil sealing effect in the oil interface.

As a method of forming the sealing surface layer 50, an electrolytic machining (ECM) method and an electrical discharge machining (EDM) method may be used. Alternately, a photolithography method, a plasma etching method, a laser patterning method, and the like, that are used in a semiconductor process, may be used. The ECM method will be first described. When a process of electrochemically dissolving a metal material is performed, a metal oxide layer, which is an anode product hindering the process, is generated. In the case of the ECM method, the metal material is machined while removing the metal oxide layer. When a tool manufactured to have a shape to machine is used as a cathode, a material is used as an anode, the tool and the material are immersed in an electrolyte solution, and a current is then applied thereto, the material is machined to have the same shape as a surface shape of the cathode. The ECM method is used to machine a hard metal, a heat resisting steel, or the like, which is difficult to be machined by a general tool. Since the tool does not rotate, it may also be used for profanation of a special shape rather than a circular shape. The EDM method may be divided into a spark machining method, an arc machining method, and a corona machining method according to a kind of electrical discharge, be divided into a metal machining method and a non-metal machining method according to a material of an object to be machined, and a drilling method, a cutting method, a grinding method, and the like according to a kind of work. The EDM method is mainly used as special machining due to advantages as follows: it may be performed regardless of strength of a material, it may easily perform machining of a complicated shape such as a plane, a three-dimensional structure, or the like, it may perform machining at a length of 0.1 to 0.2 in the case of surface machining surface deformation due to heat is less, and the like, which may not be obtained by other machining methods. The EDM method has an advantage in that a nano structure is naturally generated during a process of forming a micro sized pattern. The reason is that the EDM method is a method for performing the machining of a desired shape using a spark generated between a tool electrode and a workpiece. A heat energy generated due to the spark locally dissolves or evaporates and removes a material to be machined, such that nano roughness due to a crater created by the spark is provided. According to the preferred embodiment of the present invention, the sealing surface layer 50 has this nano roughness, thereby making it possible to effectively accomplish an object of the present invention.

An operation of the spindle motor manufactured according to the preferred embodiment of the present invention will be described.

A rotor 10 includes the shaft 11 rotated as the center of rotation and the hub 12 coupled to an upper portion of the shaft 11 and having a magnet 13 attached thereto, and a stator 20 includes a base 21, the sleeve 23, a core 22, and a pulling plate 24. Each of the core 22 and the magnet 13 is attached to an outer side of the base 21 and an inner side of the hub 12 while facing each other. When a current is applied to the core 22, a magnetic flux is generated while a magnetic field is formed. The magnet 13 facing the core 22 includes repeatedly magnetized N and S poles to thereby form an electrode, corresponding to a variable electrode generated in the core 22. The core 22 and the magnet 13 generates repulsive force therebetween due to electromagnetic force caused by interlinkage of magnetic fluxes to rotate the hub 12 and the shaft 11 coupled to the hub 12, such that the spindle motor according to the preferred embodiment of the present invention is driven. In addition, in order to prevent floating at the time of driving of the motor, the pulling plate 24 is formed on the base 21 so as to correspond to the magnet 13 in an axial direction. Attractive force acts between the pulling plate 24 and the magnet 13, thereby making it possible to stably drive rotatably the motor.

As set forth above, according to the preferred embodiment of the present invention, the sealing surface layer is formed from the inner side of the oil interface that is formed in the oil sealing part of the fluid dynamic pressure bearing part toward the outer side thereof, thereby making it possible to improve the oil sealing effect in the oil interface.

In addition, the contact angle in the contact surface of the oil is increased through the sealing surface layer formed in the oil interface to increase an oil sealing effect, thereby making it possible to prevent leakage or scattering of the oil on the oil interface.

Further, when the sealing surface layer is formed in the vicinity of the oil interface, it is formed through direct machining of the inner peripheral surface forming the oil interface, thereby making it possible to improve continuity of the sealing effect and durability of the sealing surface layer.

Furthermore, the sealing effect of the oil sealing part is improved, thereby making it possible to improve operation performance of the spindle motor and reliability of operation.

Although the preferred embodiments of the present invention have been disclosed for illustrative purposes, they are for specifically explaining the present invention and thus a spindle motor according to the present invention is not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A spindle motor comprising:
   a shaft;
   a sleeve supporting the shaft;
   a hub including the shaft coupled to the center of rotation thereof;
   an operating fluid provided between the shaft and the sleeve;
   a sealing member formed to be spaced apart from an upper surface of the sleeve, the upper surface of the sleeve perpendicular to the rotational axis of the sleeve;
   an oil sealing part including an oil interface formed between an inner peripheral surface of the sealing member and the upper surface of the sleeve, the inner peripheral surface of the sealing member and the upper surface of the sleeve facing each other with a prominence depression, and
   a sealing surface layer formed on an outer side of the oil interface.

2. A spindle motor comprising;
   a shaft;
   a sleeve supporting the shaft;
   a hub including the shaft coupled to the center of rotation thereof;

an operating fluid provided between the shaft and the sleeve;

a sealing member formed to be spaced apart from an upper surface of the sleeve, the upper surface of the sleeve perpendicular to the rotational axis of the sleeve;

an oil sealing part including an oil interface formed between an inner peripheral surface of the sealing member and the upper surface of the sleeve, the inner peripheral surface of the sealing member and the upper surface of the sleeve facing each other with a prominence depression, and a sealing surface layer formed on an outer side of the oil interface, wherein the sealing surface layer has a surface roughness larger than that of the sleeve contacted with the operating fluid and the inner peripheral surface of the sealing member.

3. The spindle motor as set forth in claim 1, wherein the sealing surface layer includes the upper surface of an axial direction of the sleeve and the inner peripheral surface of the sealing member formed on the inner side of the oil interface and is formed to be extended in an outward direction of the oil interface.

4. The spindle motor as set forth in claim 1, wherein the sealing surface layer is formed on the upper surface of the sleeve or the inner peripheral surface of the sealing member.

* * * * *